(12) United States Patent
Cho

(10) Patent No.: US 7,995,902 B2
(45) Date of Patent: Aug. 9, 2011

(54) APPARATUS AND METHOD FOR SIMULTANEOUSLY PROVIDING A PLURALITY OF TIME SHIFTING FUNCTIONS

(75) Inventor: Eun Hyung Cho, Gumi-si (KR)

(73) Assignee: LG Electronics Inc., Seoul (KR)

( * ) Notice: Subject to any disclaimer, the term of this patent is extended or adjusted under 35 U.S.C. 154(b) by 1204 days.

(21) Appl. No.: 11/638,423

(22) Filed: Dec. 14, 2006

(65) Prior Publication Data

US 2007/0154166 A1  Jul. 5, 2007

(30) Foreign Application Priority Data

Dec. 15, 2005  (KR) .................. 10-2005-0123669

(51) Int. Cl.
  *H04N 5/76*  (2006.01)
(52) U.S. Cl. ...................................... 386/291; 386/341
(58) Field of Classification Search .................. 386/291, 386/297, 298, 296, 292, 326, 341
See application file for complete search history.

(56) References Cited

U.S. PATENT DOCUMENTS

| 2001/0008427 A1 | 7/2001 | Sco |
| 2002/0092021 A1 | 7/2002 | Yap et al. |
| 2002/0174430 A1 | 11/2002 | Ellis et al. |
| 2005/0264698 A1 | 12/2005 | Eshleman |
| 2007/0077028 A1* | 4/2007 | Bodkin et al. .................. 386/95 |

FOREIGN PATENT DOCUMENTS

| CN | 1700751 A | 11/2005 |
| KR | 1020050081287 A | 8/2005 |
| KR | 1020050101767 A | 10/2005 |
| KR | 1020070002889 A | 1/2007 |
| WO | WO 99/60493 A1 | 11/1999 |

* cited by examiner

*Primary Examiner* — Robert Chevalier
(74) *Attorney, Agent, or Firm* — Birch, Stewart, Kolasch & Birch, LLP

(57) ABSTRACT

An apparatus and method for simultaneously providing a plurality of time shifting functions is disclosed. An apparatus for simultaneously providing a plurality of time shifting functions comprises a first memory for storing a first broadcast program for performing a first time-shifting function; a second memory for storing a second broadcast program for performing a second time-shifting function; and a controller for selecting and displaying at least one of the first and the second stored broadcast programs. Also, a method for simultaneously providing a plurality of time shifting functions comprises determining if a first time shifting function is used; storing a first broadcast program in a first memory for time shifting function if the first time shifting function is not used; determining if a second time shifting function is used; and storing a second broadcast program for time shifting function in the second memory if the second time shifting function is not used.

21 Claims, 4 Drawing Sheets

APPARATUS AND METHOD FOR SIMULTANEOUSLY PROVIDING A PLURALITY OF TIME SHIFTING FUNCTIONS

This application claims the benefit of Korean Patent Application No. 10-2005-0123669, filed on Dec. 15, 2005, which is hereby incorporated by reference.

BACKGROUND OF THE INVENTION

1. Field of the Invention

The present invention relates to a display device, and more particularly, to a device for simultaneously providing a plurality of time shifting functions.

2. Discussion of the Related Art

The advancement of television technology made it possible to provide various functions in addition to receiving broadcast programs, thanks to the enhancing microprocessor and the increasing memory size. One of the various functions is a time shifting (or time machine) function. The time shifting function enables users to record the broadcast programs and play the recorded programs back at a later time. Moreover, the time shifting function provides pause, backward, and forward play of broadcast programs in real time. For example, a television equipped with a time shifting function using a personal video recorder (PVR) or a digital video recorder (DVR) has a hard disk drive for storing and replaying received broadcast programs as well as external input signals such as signals from a video player.

According to the conventional time shifting function, only one time shifting function was provided since a television temporarily stops receiving the broadcast program while performing a time shifting function.

Therefore, it is highly desired to develop a technology which provides displaying broadcast programs while a plurality of time shifting functions are on.

SUMMARY OF THE INVENTION

Accordingly, the present invention is directed to an apparatus and method for simultaneously providing a plurality of time shifting functions that substantially obviates one or more problems due to the limitations and disadvantages of the related art.

An object of the present invention is to provide an apparatus and method comprising a plurality of time shifting functions for real time broadcast programs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for simultaneously providing a plurality of time shifting functions according to an embodiment includes a first memory for storing a first broadcast program for performing a first time-shifting function; a second memory for storing a second broadcast program for performing a second time-shifting function; and a controller for selecting and displaying at least one of the first and the second stored broadcast programs.

In another aspect of the present invention, a method for simultaneously providing a plurality of time shifting functions includes determining if a first time shifting function is used; storing a first broadcast program in a first memory for time shifting function if the first time shifting function is not used; determining if a second time shifting function is used; and storing a second broadcast program for time shifting function in the second memory if the second time shifting function is not used.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
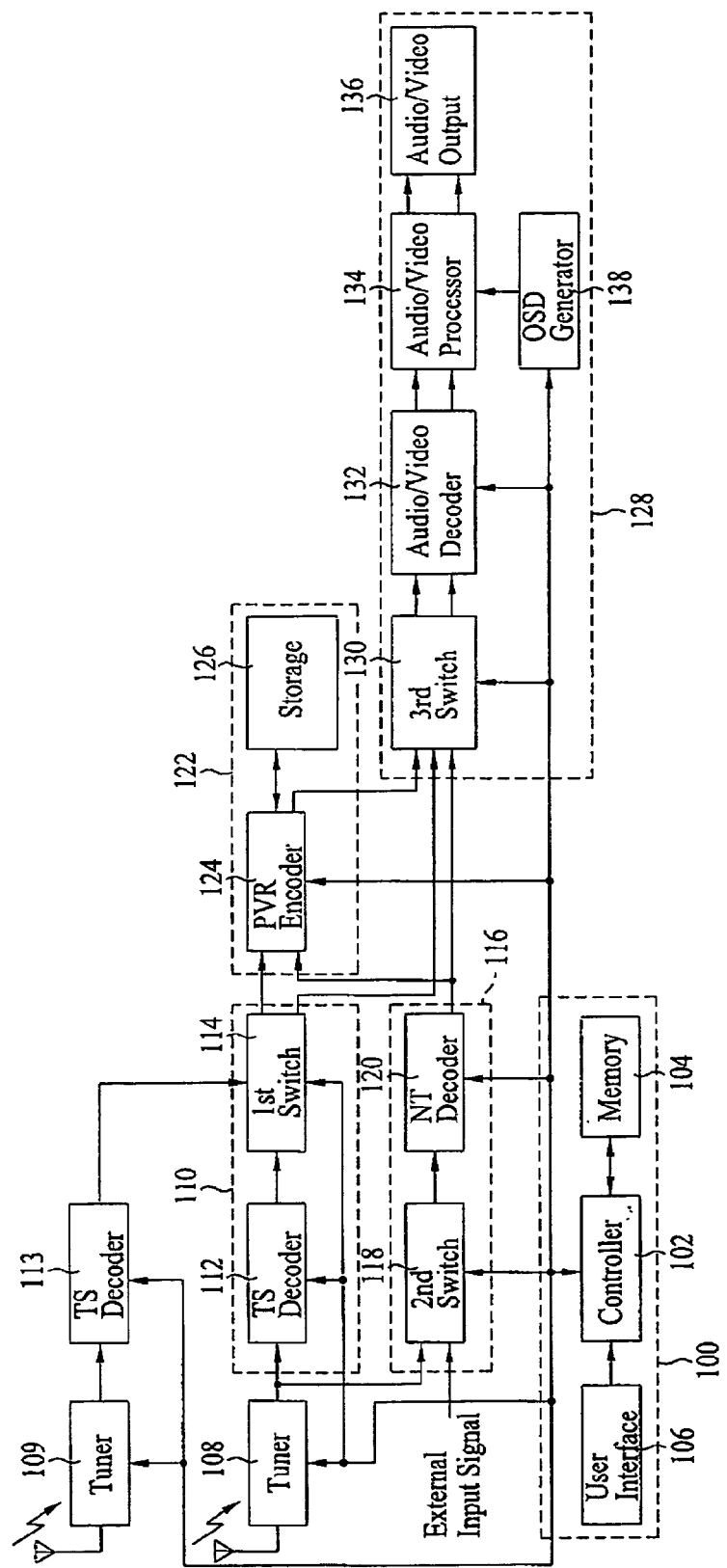
FIG. 1 illustrates a block schematic diagram of a television with a personal video recorder (PVR) according to an embodiment of the invention.

FIG. 1 shows a block schematic diagram of a television with a personal video recorder (PVR). The television comprises a controller device (100), a plurality of tuners (108 & 109) for searching for channel(s) by the control of the controller device (100), a digital signal processor (110) for processing digital signals, an analog signal processor (116) for processing analog signals, a personal video recorder (PVR, 122) for saving and replaying the analog and/or digital signals, and a signal output part (128) for outputting signals from the analog signal processor, the digital signal processor, or the PVR. All components of the TV with the PVR are operatively coupled and configured.

Figure 2:
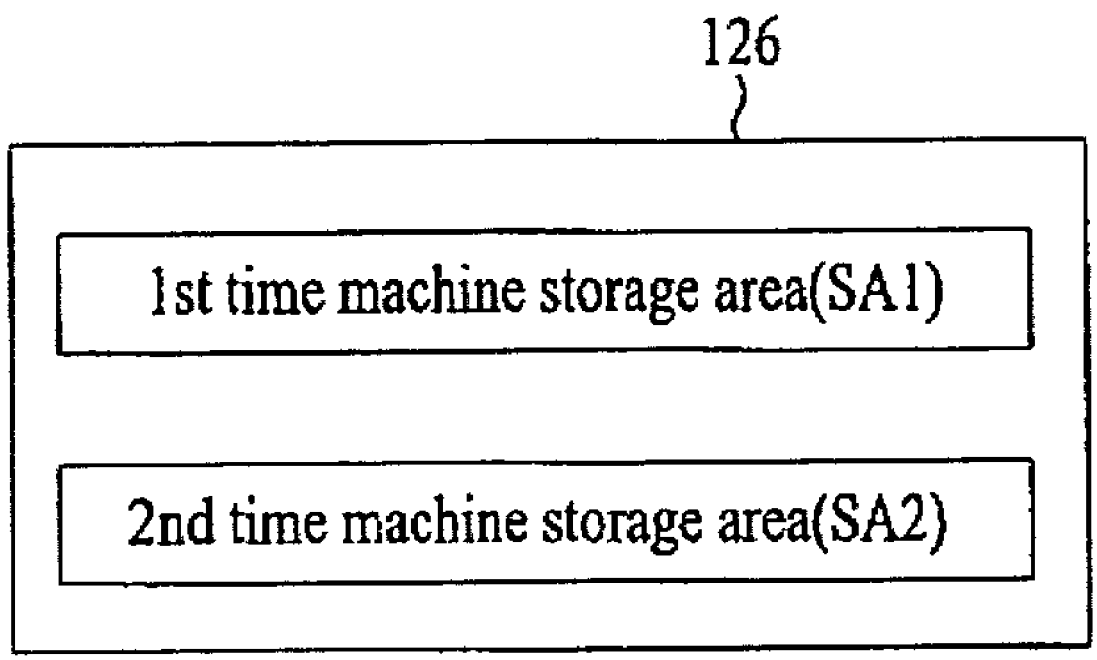
FIG. 2 illustrates an enlarged view of the storage (126) in FIG. 1 showing the first time shifting storage area and the second time shifting storage area.

The controller device (100) further comprises a controller (102), a memory (104) and a user interface (106). The controller (102) controls the general operations of the television and outputs video signals according to the first time shifting function as well as storing the real time broadcast signals at a first time shifting storage area (SA1) of the storage (126) as shown in FIG. 2. At that time, the controller (102) outputs real time broadcast signals at a sub screen. When the second time shifting function is ordered, the controller (102) outputs video signals to the sub screen according to the second time shifting function as well as storing the real time broadcast signals at a second time function storage area (SA2) of the storage (126). While performing the first and the second time shifting functions, the controller (102) selectively outputs audio signals to a speaker or to an audio output port according to the first and the second time shifting functions. Thereby, an audio signal for the first or the second time shifting program respectively is selectively provided.

Moreover, the controller (102) displays the first and the second time shifting control OSDs on the main screen and the sub screen respectively.

The controller controls an On Screen Display (OSD) data generator (138) for generating the OSD data for displaying a list of the temporarily-stored plurality of programs. When a user selects a program which is displayed on the screen using the OSD data generator, the selected program is copied from the time shifting storage area to one of permanent storage areas (SA1 or SA2). The controller can store the program according to the genre of the program.

The memory (104) stores various information including processing commands of the controller. Specially, the memory (104) can store the time shifting recording table comprising a plurality of time shifting recording information. The time shifting recording table contains titles, genres, program information, recording-start address and time, and recording-end address and time of the temporarily stored programs.

The user interface (106) is an appropriate communication technology, such as keyboards, remote controls or keypad devices for providing commands or information from the user to the controller (102).

The tuners (108 & 109) search for a channel according to the control signal of the controller (102) and provide digital signal to digital signal processor (110) and analog signal to analog signal processor (116).

The digital signal processor (110) includes Transport Stream (TS) decoders (112 & 113) and the first switch (114). The TS decoders (112 & 113) decode the digital signals from the tuners (108 & 109), transform it to audio, video or data stream, and transmit it to the first switch (114).

The first switch (114) provides the audio, video or data stream from TS decoders (112 & 113) to PVR (122) and/or the signal output part (128).

The analog signal processor (116) includes the second switch (118) and NT (National Television Standards Committee: NTSC) decoder (120). The second switch (118) receives analog signals from the tuner (108) and/or from external input, and provides one of the two analog signals to the NT (NTSC) decoder (120).

The NT decoder (120) decodes the analog signal from the tuner (108) or from the external input, transforms it to audio, video or data stream, and transmits it to the PVR part (122) or signal output part (128).

The PVR part (122) includes a PVR encoder (124) and the storage (126). The PVR encoder (124) stores in the storage (126) the audio, video and data streams from the digital signal processor (110) according to a control signal of the controller (102), or stores the audio, video and data streams in the storage (126) by Moving Pictures Experts Group (MPEG)-encoding the audio and video signals from the analog signal processor (116).

The storage (126) stores audio, video and data streams from the PVR encoder (124) and is a hard disk drive including a hard disk. Particularly, the hard disk of the storage (126) has a plurality of time shifting storage areas (SA1 & SA2) which store broadcast programs during the time shifting function operation.

The addresses of the audio, video and data streams in the storage (126) are provided to the controller (102) by the PVR encoder (124). The storage (126) actually stores audio, video and data streams received from broadcasting, and audio and video streams encoded with signals from external inputs. However, it is regarded for convenience that the storage (126) stores each broadcast program basis.

The signal output part (128) includes the third switch (130), audio and video decoder (132), audio and video processor (134), audio and video output (136) and OSD generator (138).

The third switch (130) selects one of the outputs from the digital signal processor (110), analog signal processor (116) and PVR part (122), and provides the selected output to the audio and video decoder (132).

The audio and video decoder (132) decodes the audio and/or video streams into audio and/or video data if the input is the audio and/or video streams and provides it to the audio and video processor (134). If the input is the audio and/or video data, then the audio and video decoder (132) provides the audio and/or video data itself to the audio and video processor (134).

The audio and video processor (134) provides the audio and video data from the audio and video decoder (132) to the audio and video output (136). Also, the audio and video processor (134) provides the video data mixed with the OSD data from the OSD generator (138) to the audio and video output (136).

The audio and video output (136) outputs the audio and video data from the audio and the video processor (134) using a display device and/or a speaker.

The OSD generator (138) generates OSD data according to a signal from the controller (102) and provides it to the audio and video processor (134).

Figure 3:
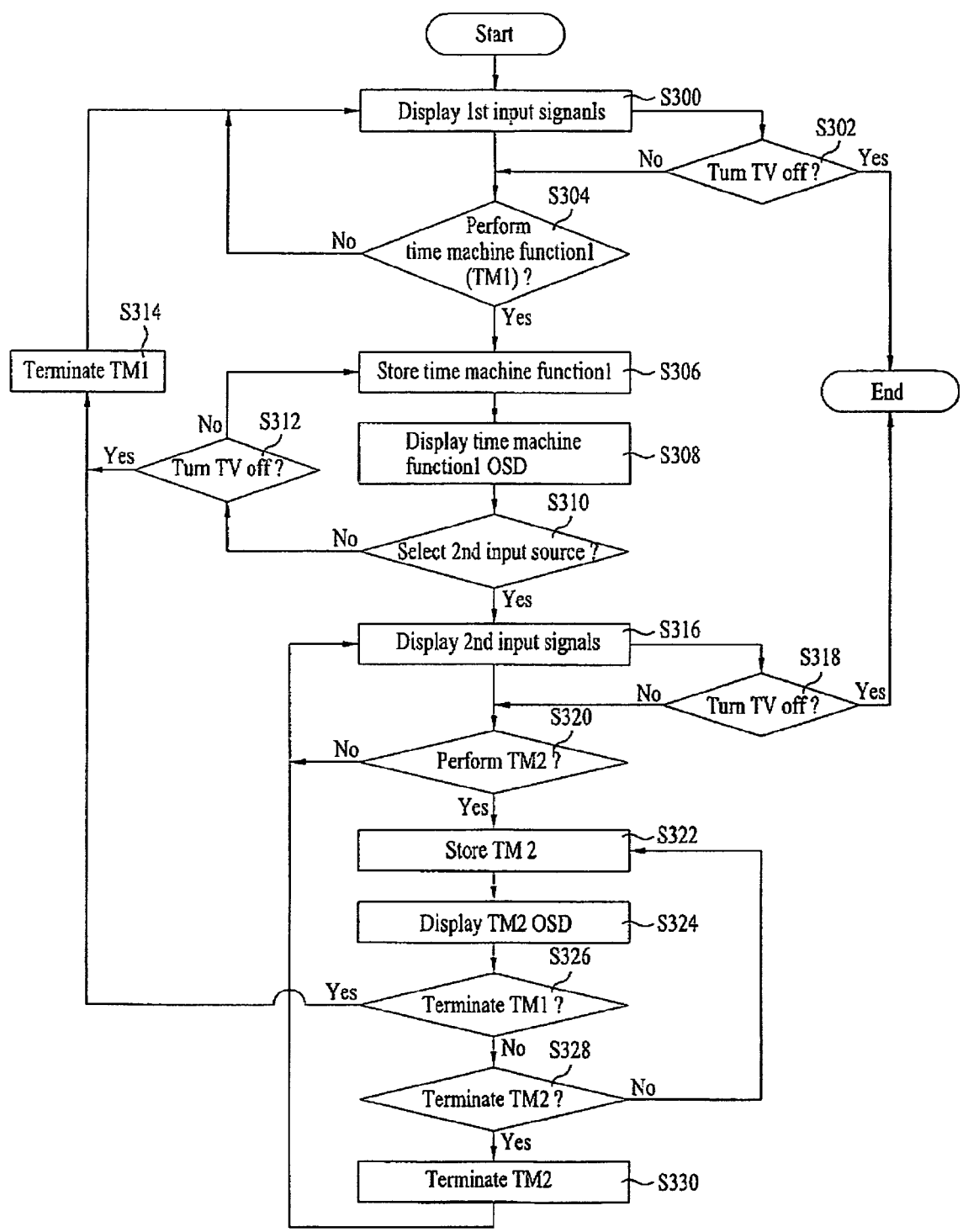
FIG. 3 illustrates a flowchart of one example of simultaneously operating two time shifting functions according to the embodiment of FIG. 1.

Turning now to FIG. 3, a flowchart is shown illustrating an example of simultaneously operating two time shifting functions according to the embodiment of FIG. 1. The method is discussed as implemented in the TV of FIG. 1, but can be implemented in other suitable device(s).

The television receives signals from various input sources including tuners (108 & 109) and external devices, and displays signals from one (first input source) of them at the main screen associated with the television (S300). The controller (102) checks if the user performs a first time shifting function while the signals from the first input source are being displayed at the main screen (S304). If the user performs the first time shifting function, the controller (102) stores a real time broadcast program including its program information according to the first time shifting function at the first storage area (SA1) of the storage (S306). It is to be noted that the program information may be obtained from Packet Identification (PID) and Electronic Program Guide (EPG). The EPG is a database containing information regarding broadcast schedules from various broadcast channels. The broadcast program stored in the first storage area (SA1) according to the first time shifting function can be referred to herein as the first time-shifted broadcast program.

Figure 4:
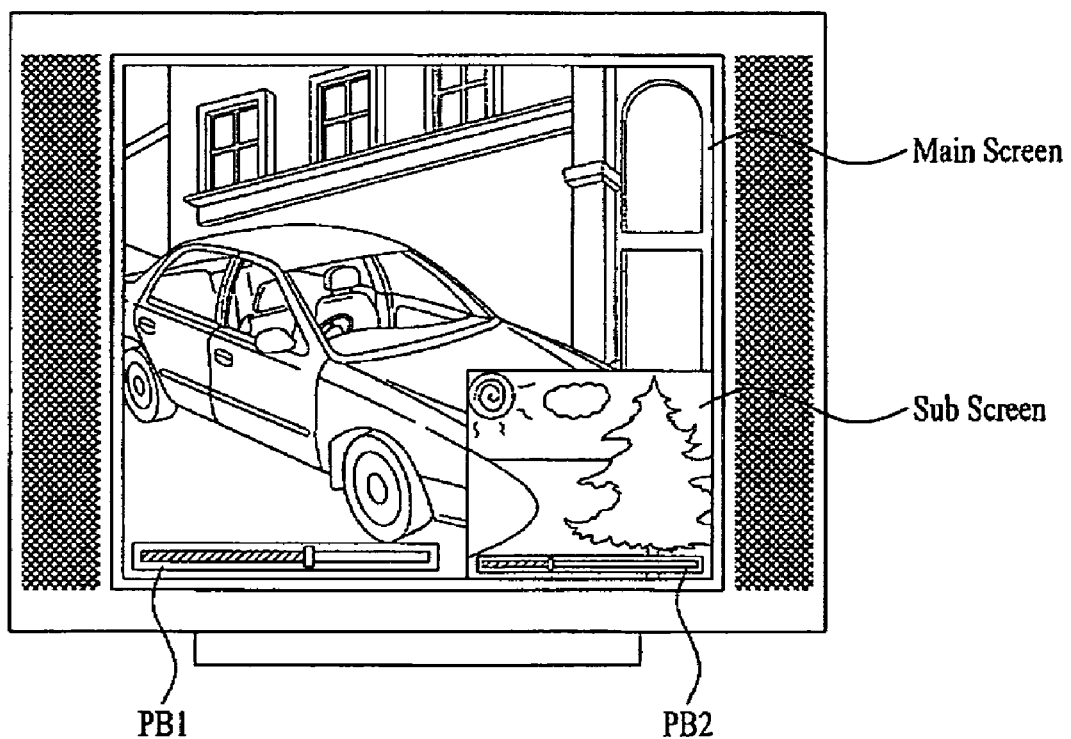
FIG. 4 illustrates an example of a main screen and a sub screen with progress bars (PB1 & PB2) while two time shifting functions are on according to an embodiment of the invention.

The controller (102) displays an On Screen Display (OSD) menu for the first time shifting function and the first time-shifted broadcast program on the main screen (S308), e.g., see FIG. 4. At the same time, the controller (102) displays a real time broadcast program on the sub screen associated with the main screen (S316) if the user chooses a second input source (S310). Here, the real time broadcast program displayed on the sub screen would be from the second input source.

Again, at this time, if the user performs a second time shifting function (S320), the controller (102) stores the real time broadcast program received from the second input source, including its program information, according to the second time shifting function at the second storage area (SA2) of the storage (S322). The broadcast program stored in the second storage area (SA2) according to the second time shifting function can be referred to herein as the second time-shifted broadcast program.

Then, the controller (102) displays an On Screen Display (OSD) menu for the second time shifting function and the second time-shifted broadcast program on the sub screen (S324), e.g., as shown in FIG. 4.

While the two (first and second) time shifting functions are operating at the same time, the controller (102) checks if the first time shifting function is to be terminated. If the first time shifting function is to be terminated (S326), the first time shifting function is terminated and the main screen will display a real time broadcast program (e.g., currently receiving broadcast program) instead of displaying the first time-shifted broadcast program (S314). Likewise, if the second time shifting function is to be terminated (S328), the second time shifting function is terminated and the sub screen will display a real time broadcast program (e.g., currently receiving broadcast program), instead of the second time-shifted broadcasting program (S330).

During the method, if the TV is to be turned off at step S302 or S318, then the process ends. At step S310, if the second input source is not selected, then the controller checks whether or not the TV is to be turned off (e.g., based on the user's command) (S312) and the process moves to either step S306 or S314 depending on the checked result.

FIG. 4 shows one example of simultaneously operating two time shifting functions with the main screen displaying the first time-shifted broadcast program and the sub screen displaying the second time-shifted broadcast program, on a single display unit. Each time-shifted program can be easily operated using a progress bar (PB1 or PB2). Various progress bars are known and can be used, which can be an example of OSD data. In the description, a device and method using only two time shifting functions simultaneously are discussed. However, the present invention includes using multiple time shifting functions (e.g., simultaneously displaying and operating three or more time-shifted programs on a display unit).

While the invention has been described with respect to the physical embodiments constructed in accordance therewith, it will be apparent to those skilled in the art that various modifications, variations and improvements of the present invention can be made without departing from the spirit or scope of the inventions. Thus, it is intended that the present invention covers the modifications and variations of this invention provided they come within the scope of the appended claims and their equivalents.

What is claimed is:

1. An apparatus for simultaneously providing a plurality of time shifting functions, the apparatus comprising:
a screen including first and second regions;
a first memory configured to store a first broadcast program for performing a first time-shifting function;
a second memory configured to store a second broadcast program for performing a second time-shifting function; and
a controller configured to simultaneously display the first and second time-shifting functions within the first and second regions of the screen, respectively.

2. The apparatus of claim 1, further comprising a personal video recorder (PVR).

3. The apparatus of claim 2, wherein the first memory and the second memory are located in the PVR.

4. The apparatus of claim 1, wherein the apparatus comprises a plurality of screens.

5. The apparatus of claim 1, wherein the apparatus comprises video process units configured to process at least one of the first broadcast program and the second broadcast program.

6. The apparatus of claim 1, wherein each of the first and second memories includes a time shifting recording table which contains program information, a recording-start point information and a recording-end point information.

7. The apparatus of claim 6, wherein the time shifting recording table is updated when a channel or the program is changed.

8. The apparatus of claim 1, further comprising:
an OSD data generator configured to generating OSD data for at least one of the first broadcast program and the second broadcast program.

9. The apparatus of claim 1, wherein the controller stores the first broadcast program or the second broadcast program according to a genre of the corresponding program.

10. The apparatus of claim 1, wherein at least one of the first and second memories includes a time shifting recording table containing titles, genres, program information, recording-start point information and recording-end point information of the stored program.

11. The apparatus of claim 1, further comprising:
at least one tuner configured to search for a channel according to a control signal of the controller, and to provides digital signals associated with the channel to a digital signal processor or analog signals associated with the channel to an analog signal processor.

12. A method for simultaneously providing a plurality of time shifting functions using an apparatus including a screen and first and second memories, the method comprising:
determining, by the apparatus, if a first time-shifting function for a first broadcast program is currently being used;
storing the first broadcast program for the first time-shifting function in the first memory if the first time-shifting function is not currently being used;
determining, by the apparatus, if a second time-shifting function for a second broadcast program is currently being used;
storing the second broadcast program for the second time-shifting function in the second memory if the second time-shifting function is not currently being used and
generating control data for simultaneously displaying the first and second time-shifting functions within first and second regions of the screen, respectively.

13. The method of claim 12, further comprising:
displaying the stored first broadcast program and the stored second broadcast program within the first and second regions of the screen respectively.

14. The method of claim 13, wherein the control data includes first OSD data for the first time-shifting function and second OSD data for the second time-shifting function.

15. The method of claim 13, wherein the first and second time-shifting functions as well as the stored first and second broadcast programs are simultaneously displayed within the first and second regions of the screen.

16. The method of claim 12, further comprising:
when the first or second time-shifting function is not used, displaying a real time broadcast program in at least one of the first and second regions of the screen.

17. The method of claim 14, wherein the first or second OSD data is displayed in a picture in picture (PIP) form.

18. The method of claim 14, wherein the first OSD data includes a progress bar for controlling the first time-shifting function of the first broadcast program, and the second OSD data includes a progress bar for controlling the second time-shifting function of the second broadcast program.

19. The apparatus of claim 1, further comprising:
an OSD generator configured to generate first OSD data for the first time-shifting function and second OSD data for the second time-shifting function.

20. The apparatus of claim 19, wherein the controller displays simultaneously (a) the generated first OSD data within the first region displaying the first broadcast program and (b) the generated second OSD data within the second region displaying the second broadcast program.

21. The apparatus of claim 20, wherein the displayed first OSD data includes a progress bar for controlling the first time-shifting function of the first broadcast program, and the displayed second OSD data includes a progress bar for controlling the second time-shifting function of the second broadcast program.

* * * * *